United States Patent
Qin et al.

(10) Patent No.: US 10,432,018 B2
(45) Date of Patent: Oct. 1, 2019

(54) POWER SUPPLY BUS CIRCUIT

(71) Applicant: Huawei Technologies Co., Ltd., Shenzhen (CN)

(72) Inventors: Zhen Qin, Shenzhen (CN); Fanglin Li, Shenzhen (CN); Boning Huang, Shenzhen (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 762 days.

(21) Appl. No.: 15/090,724

(22) Filed: Apr. 5, 2016

(65) Prior Publication Data

US 2016/0218558 A1    Jul. 28, 2016

Related U.S. Application Data

(63) Continuation of application No. PCT/CN2015/078414, filed on May 6, 2015.

(30) Foreign Application Priority Data

Nov. 18, 2014    (CN) .......................... 2014 1 0658158

(51) Int. Cl.
*H02J 1/00*    (2006.01)
*H02J 3/36*    (2006.01)
(Continued)

(52) U.S. Cl.
CPC .............. *H02J 9/061* (2013.01); *H02J 7/0068* (2013.01); *Y02B 10/72* (2013.01)

(58) Field of Classification Search
CPC .......... H02J 9/061; H02J 7/0068; Y02B 10/72
(Continued)

(56) References Cited

U.S. PATENT DOCUMENTS 5,612,581 A * 3/1997 Kageyama .............. H02J 1/102
307/64
5,726,849 A * 3/1998 Nakamura ............. H02H 9/001
361/93.5
(Continued)

FOREIGN PATENT DOCUMENTS

CN    102751781 A    10/2012
CN    103391012 A    11/2013
(Continued)

OTHER PUBLICATIONS

Foreign Communication From a Counterpart Application, European Application No. 15845503.0, Extended European Search Report dated Oct. 30, 2017, 13 pages.
(Continued)

*Primary Examiner* — Brandon S Cole
(74) *Attorney, Agent, or Firm* — Conley Rose, P.C.

(57)    ABSTRACT

A power supply bus circuit includes a high-voltage power supply circuit, the high-voltage power supply circuit includes at least two first alternating current/direct current converters and further includes at least two high-voltage direct current power supply buses, and the first alternating current/direct current converter connects to mains, adjusts the connected mains into a high-voltage direct current, and outputs the high-voltage direct current to the high-voltage direct current power supply bus that is electrically connected to the first alternating current/direct current converter, where the high-voltage power supply circuit further includes at least one first direct current/direct current converter, where the first direct current/direct current converter performs voltage conversion on the high-voltage direct current between two high-voltage direct current power supply buses connected to the first direct current/direct current converter.

6 Claims, 10 Drawing Sheets

(51) Int. Cl.
*H02J 9/06* (2006.01)
*H02M 5/42* (2006.01)
*H02M 3/335* (2006.01)
*H02M 3/158* (2006.01)
*H02J 9/08* (2006.01)
*H02J 7/00* (2006.01)

(58) Field of Classification Search
USPC .................................................. 307/1–87
See application file for complete search history.

(56) References Cited

U.S. PATENT DOCUMENTS

| | | | |
|---|---|---|---|
| 6,243,277 | B1 | 6/2001 | Sun et al. |
| 8,447,435 | B1 | 5/2013 | Miller et al. |
| 2002/0071292 | A1* | 6/2002 | Aihara ................ H02J 9/061 363/20 |
| 2004/0119454 | A1 | 6/2004 | Chang et al. |
| 2006/0152085 | A1* | 7/2006 | Flett .................... B60L 9/30 307/75 |
| 2009/0026841 | A1* | 1/2009 | Nakanishi ............. H02J 3/005 307/66 |
| 2010/0219684 | A1 | 9/2010 | Iino |
| 2011/0043160 | A1* | 2/2011 | Serban .................. G05F 1/67 320/101 |
| 2011/0044077 | A1* | 2/2011 | Nielsen ............... H02J 9/062 363/37 |
| 2011/0227416 | A1 | 9/2011 | Lecourtier |
| 2012/0232709 | A1 | 9/2012 | Robinett, III et al. |
| 2014/0183949 | A1 | 7/2014 | Murano |
| 2016/0006247 | A1 | 1/2016 | Fang |

FOREIGN PATENT DOCUMENTS

| | | | |
|---|---|---|---|
| CN | 103701203 | A | 4/2014 |
| CN | 104037929 | A | 9/2014 |
| CN | 104065281 | A | 9/2014 |
| CN | 104333122 | A | 2/2015 |
| EP | 1919054 | A2 | 5/2008 |
| JP | 56-041733 | A | 4/1981 |
| JP | 2002204089 | A | 7/2002 |
| JP | 2003018745 | A | 1/2003 |
| JP | 2010206875 | A | 9/2010 |

OTHER PUBLICATIONS

Machine Translation and Abstract of Chinese Publication No. CN104065281, Sep. 24, 2014, 23 pages.
Machine Translation and Abstract of Japanese Publication No. JP2002204089, Jul. 19, 2002, 12 pages.
Machine Translation and Abstract of Japanese Publication No. JP2003018745, Jan. 17, 2003, 9 pages.
Machine Translation and Abstract of Japanese Publication No. JPS56-041733, Apr. 18, 1981, 8 pages.
Foreign Communication From a Counterpart Application, Japanese Application No. 2016-575320, Japanese Notice of Rejection dated Jul. 18, 2017, 2 pages.
Foreign Communication From a Counterpart Application, Japanese Application No. 2016-575320, English Translation of Japanese Notice of Rejection dated Jul. 18, 2017, 2 pages.
Foreign Communication From a Counterpart Application, Chinese Application No. 201410658158.8, Chinese Office Action dated Aug. 7, 2017, 4 pages.
Partial English Translation and Abstract of Chinese Patent Application No. CN102751781, Feb. 17, 2016, 6 pages.
Partial English Translation and Abstract of Chinese Patent Application No. CN103701203, Feb. 17, 2016, 8 pages.
Partial English Translation and Abstract of Chinese Patent Application No. CN104333122, Part 1, Apr. 1, 2016, 10 pages.
Partial English Translation and Abstract of Chinese Patent Application No. CN104333122, Part 2, Apr. 1, 2016, 3 pages.
Foreign Communication From a Counterpart Application, Chinese Application No. 201410658158.8, Chinese Office Action dated Dec. 25, 2015, 7 pages.
Foreign Communication From a Counterpart Application, Chinese Application No. PCT/CN2015/078414, English Translation of International Search Report dated Aug. 7, 2015, 2 pages.
Foreign Communication From a Counterpart Application, Chinese Application No. PCT/CN2015/078414, Written Opinion dated Aug. 7, 2015, 4 pages.

\* cited by examiner

POWER SUPPLY BUS CIRCUIT

CROSS-REFERENCE TO RELATED APPLICATIONS

This application is a continuation of International Application No. PCT/CN2015/078414, filed on May 6, 2015, which claims priority to Chinese Patent Application No. 201410658158.8, filed on Nov. 18, 2014, both of which are hereby incorporated by reference in their entireties.

TECHNICAL FIELD

The present disclosure relates to the high-voltage power supply field, and in particular, to a power supply bus circuit.

BACKGROUND

With continuous innovation and rapid development of information technologies (IT), communications technologies (CT), and information and communications technologies (ICT), a higher requirement is imposed on a data load device, for example, it is required that a data load device not be disconnected from power.

In particular, it is required that a server and a storage device that serve as data load devices be stably and continuously powered without interruption. In the prior art, a power supply to a data load device in the industry is characterized in two aspects: 1) multiple redundant power supplies are designed, where all the redundant power supplies are mounted on a single bus in order to ensure that the single bus supplies power to a data load device without interruption. however, additional redundant power supplies correspondingly increase investment; 2) power supply modes are diversified and different, which results in a difficulty in operation and maintenance. In the prior art, power supply voltages, currents, or power required by different data load devices are much different, therefore, it is required to build different matching power supply circuits.

Two types of relatively mature power supply technologies are available in the prior art. The first is an uninterruptible power supply (UPS) power supply technology, and the second is a high-voltage direct current (HVDC) power supply technology.

In the prior art, different data load devices have different individualized requirements. For example, a power supply voltage required by a data load device of China Telecom® is a 240 volt (V) direct current, a power supply voltage required by a data load device of China Mobile® is a 336V direct current, and power supply voltages required by data load devices in countries (for example, South Korea, Switzerland, Japan, and the United States) other than China are direct currents ranging from 216V to 400V. A difference in power supply voltages required by different data load devices results in different voltage modes of HVDC power supply buses. Operators, enterprises, and research institutions propose merely HVDC technical architectures and solutions meeting their own development plans based on requirements of their actual disclosure scenarios and technical development stages. Therefore, because of a difference in data load device, a regional difference, and a difference in technical development stage, voltages carried by different HVDC power supply buses are basically different, and it is difficult to unify them. It is necessary to build matching high-voltage direct current power supply circuits according to individualized power supply requirements of different data load devices in order to supply matching power supply voltages to the data load devices through high-voltage direct current power supply buses of the high-voltage direct current power supply circuits.

FIG. 1 shows a high-voltage direct current power supply circuit commonly used in the prior art, which includes an alternating current/direct current conversion module, a storage battery, and a high-voltage direct current power supply bus. The alternating current/direct current conversion module connects to mains, adjusts the connected mains into a high-voltage direct current, and outputs the high-voltage direct current to the high-voltage direct current power supply bus in order to power a data load device through the high-voltage direct current power supply bus and charge the storage battery at the same time. If the data load device is powered off abnormally, that is, the alternating current/direct current conversion module does not operate properly, the storage battery that has been charged proceeds to power the data load device through the high-voltage direct current power supply bus in order to ensure uninterruptible power supply. However, when both the alternating current/direct current conversion module and the storage battery become faulty, this high-voltage direct current power supply circuit commonly used in the prior art is inapplicable, and the data load device is to be disconnected from power.

SUMMARY

An objective of the present disclosure is to provide a power supply bus circuit in order to power a load on a high-voltage power supply bus without interruption by implementing mutual backup of power supplies between different high-voltage power supply buses.

According to a first aspect, the present disclosure provides a power supply bus circuit, including a high-voltage power supply circuit, where the high-voltage power supply circuit includes at least two first alternating current/direct current conversion modules and further includes at least two high-voltage direct current power supply buses. The first alternating current/direct current conversion module has a first mains end, and one first alternating current/direct current conversion module is electrically connected to one high-voltage direct current power supply bus, and the first alternating current/direct current conversion module connects to mains using the first mains end, adjusts the connected mains into a high-voltage direct current, and outputs the high-voltage direct current to the high-voltage direct current power supply bus that is electrically connected to the first alternating current/direct current conversion module, and the high-voltage power supply circuit further includes at least one first direct current/direct current conversion module. One first direct current/direct current conversion module is electrically connected between two high-voltage direct current power supply buses, and the first direct current/direct current conversion module performs voltage conversion on a high-voltage direct current between the two high-voltage direct current power supply buses that are connected to the first direct current/direct current conversion module in order to implement mutual backup of power supplies between the two high-voltage direct current power supply buses.

With reference to the first aspect, in a first possible implementation manner of the first aspect, the high-voltage power supply circuit further includes at least one first control module, and each first control module is correspondingly connected to one first direct current/direct current conversion module, where the first control module controls, when detecting that a voltage of a first high-voltage direct current power supply bus is lower than a first voltage threshold, the first direct current/direct current conversion module to convert and transfer a high-voltage direct current on a second high-voltage direct current power supply bus to the first high-voltage direct current power supply bus, where the two high-voltage direct current power supply buses that are connected to the first direct current/direct current conversion module include the first high-voltage direct current power supply bus and a second high-voltage direct current power supply bus.

With reference to the first aspect or the first possible implementation manner of the first aspect, in a second possible implementation manner of the first aspect, the high-voltage power supply circuit further includes at least one high-voltage backup power supply, and one high-voltage direct current power supply bus is electrically connected to one or more high-voltage backup power supplies.

With reference to the second possible implementation manner of the first aspect, in a third possible implementation manner of the first aspect, the high-voltage backup power supply includes one or more rechargeable power supplies, and one high-voltage direct current power supply bus is electrically connected to one or more rechargeable power supplies, and the rechargeable power supplies are charged or discharge through the high-voltage direct current power supply bus that is connected to the rechargeable power supplies.

With reference to the second possible implementation manner of the first aspect or the third possible implementation manner of the first aspect, in a fourth possible implementation manner of the first aspect, the high-voltage backup power supply includes one or more new energy power supplies, and one high-voltage direct current power supply bus is electrically connected to one or more new energy power supplies, and the new energy power supplies discharge through the high-voltage direct current power supply bus that is connected to the new energy power supplies.

With reference to the first aspect, the fifth implementation manner of the first aspect, the second possible implementation manner of the first aspect, or the third possible implementation manner of the first aspect, in a fourth possible implementation manner of the first aspect, the new energy power supply includes a solar energy power supply and a wind energy power supply.

With reference to the second possible implementation manner of the first aspect, the third possible implementation manner of the first aspect, or the fourth possible implementation manner of the first aspect, in a fifth possible implementation manner of the first aspect, the first alternating current/direct current conversion module includes a power grid feedback module, and the power grid feedback module included by the first alternating current/direct current conversion module receives, when the high-voltage backup power supply discharges, a high-voltage direct current from the high-voltage direct current power supply bus that is connected to the first alternating current/direct current conversion module, inverts the received high-voltage direct current into an alternating current, and outputs the alternating current through the first mains end of the first alternating current/direct current conversion module.

With reference to the first aspect, the first implementation manner of the first aspect, the second possible implementation manner of the first aspect, the third possible implementation manner of the first aspect, the fourth possible implementation manner of the first aspect, or the fifth possible implementation manner of the first aspect, in a sixth possible implementation manner of the first aspect, multiple first direct current/direct current conversion modules included by the high-voltage power supply circuit are first conversion modules of a same type. The high-voltage power supply circuit further includes at least one bus bridge module. One bus bridge module is electrically connected between two high-voltage direct current power supply buses that are correspondingly connected to two first conversion modules, and the bus bridge module shorts out, when a close instruction is detected, the two high-voltage direct current power supply buses electrically connected to the bus bridge module, and breaks, when an open instruction is detected, a short circuit between the two high-voltage direct current power supply buses electrically connected to the bus bridge module.

With reference to the first aspect, the first implementation manner of the first aspect, the second possible implementation manner of the first aspect, the third possible implementation manner of the first aspect, the fourth possible implementation manner of the first aspect, the fifth possible implementation manner of the first aspect, or the sixth possible implementation manner of the first aspect, in a seventh possible implementation manner of the first aspect, the power supply bus circuit further includes one or more UPS power supply circuits, and further includes one or more second direct current/direct current conversion modules. The UPS power supply circuit includes a second alternating current/direct current conversion module, a UPS direct current bus, and a direct current/alternating current conversion module, where the UPS direct current bus is electrically connected between the second alternating current/direct current conversion module and the direct current/alternating current conversion module, and one second direct current/direct current conversion module is electrically connected between one high-voltage direct current power supply bus and the UPS direct current bus. The second alternating current/direct current conversion module has a second mains end, and the second alternating current/direct current conversion module connects to mains using the second mains end, adjusts the connected mains into a direct current, and outputs the direct current to the UPS direct current bus that is electrically connected to the second alternating current/direct current conversion module. The second direct current/direct current conversion module performs voltage conversion between the high-voltage direct current power supply bus connected to the second direct current/direct current conversion module and the UPS direct current bus connected to the second direct current/direct current conversion module, and the direct current/alternating current conversion module receives a direct current from the UPS direct current bus electrically connected to the direct current/alternating current conversion module, and converts the received direct current into an alternating current in order to power a load using the alternating current obtained by means of conversion.

With reference to the seventh possible implementation manner of the first aspect, in an eighth possible implementation manner of the first aspect, the high-voltage power supply circuit further includes at least one second control module, and each second control module is correspondingly connected to one second direct current/direct current conversion module. The second control module controls, when detecting that a voltage of the high-voltage direct current power supply bus is lower than a second voltage threshold, the second direct current/direct current conversion module to convert and transfer a direct current on the UPS direct current bus to the high-voltage direct current power supply bus, and the second control module controls, when detecting that a voltage of the UPS direct current bus is lower than a third voltage threshold, the second direct current/direct current conversion module to convert and transfer a high-voltage direct current on the high-voltage direct current power supply bus to the UPS direct current bus.

With reference to the first aspect, the first implementation manner of the first aspect, the second possible implementation manner of the first aspect, the third possible implementation manner of the first aspect, the fourth possible implementation manner of the first aspect, the fifth possible implementation manner of the first aspect, the sixth possible implementation manner of the first aspect, the seventh possible implementation manner of the first aspect, or the eighth possible implementation manner of the first aspect, in a ninth possible implementation manner of the first aspect, the UPS power supply circuit further includes at least one UPS backup power supply, one UPS direct current bus is electrically connected to one or more UPS backup power supplies, and the UPS backup power supplies are charged or discharge through a direct current bus connected to the UPS backup power supplies.

With reference to the first aspect, the first implementation manner of the first aspect, the second possible implementation manner of the first aspect, the third possible implementation manner of the first aspect, the fourth possible implementation manner of the first aspect, the fifth possible implementation manner of the first aspect, the sixth possible implementation manner of the first aspect, the seventh possible implementation manner of the first aspect, the eighth possible implementation manner of the first aspect, or the ninth possible implementation manner of the first aspect, in a tenth possible implementation manner of the first aspect, the power supply bus circuit further includes one or more alternating current power supply circuits, and further includes one or more third alternating current/direct current conversion modules. The alternating current power supply circuit includes an alternating current/alternating current conversion module and an alternating current bus, where the alternating current/alternating current conversion module is electrically connected to the alternating current bus, and one third alternating current/direct current conversion module is electrically connected between one high-voltage direct current power supply bus and one alternating current bus. The alternating current/alternating current conversion module has a third mains end, where the alternating current/alternating current conversion module connects to mains using the third mains end, adjusts the connected mains into an alternating current of a specified type, and outputs the alternating current of the specified type to the alternating current bus electrically connected to the alternating current/alternating current conversion module, and the third alternating current/direct current conversion module converts a high-voltage direct current carried by the high-voltage direct current power supply bus connected to the third alternating current/direct current conversion module into an alternating current of a specified type, and outputs the alternating current obtained by means of conversion to the alternating current bus connected to the third alternating current/direct current conversion module, or converts an alternating current carried by the alternating current bus connected to the third alternating current/direct current conversion module into a high-voltage direct current, and outputs the high-voltage direct current obtained by means of conversion to the high-voltage direct current power supply bus connected to the third alternating current/direct current conversion module.

With reference to the first aspect, the first implementation manner of the first aspect, the second possible implementation manner of the first aspect, the third possible implementation manner of the first aspect, the fourth possible implementation manner of the first aspect, the fifth possible implementation manner of the first aspect, the sixth possible implementation manner of the first aspect, the seventh possible implementation manner of the first aspect, the eighth possible implementation manner of the first aspect, the ninth possible implementation manner of the first aspect, or the tenth possible implementation manner of the first aspect, in an eleventh possible implementation manner of the first aspect, the power supply bus circuit further includes an adjustment and control module, where the adjustment and control module is connected to the first alternating current/direct current conversion module. The adjustment and control module outputs a voltage adjustment instruction to the first alternating current/direct current conversion module, and the first alternating current/direct current conversion module adjusts, in a process of adjusting an connected mains into a high-voltage direct current, the high-voltage direct current to a preset voltage specified by the voltage adjustment instruction, and outputs a high-voltage direct current having the preset voltage to the high-voltage direct current power supply bus electrically connected to the first alternating current/direct current conversion module.

Advantageous effects of the present disclosure are as follows. A first direct current/direct current conversion module is added separately between each pair of high-voltage power supply buses requiring mutual backup of power supplies. If one high-voltage power supply bus of the pair of high-voltage power supply buses is to be off (if a first alternating current/direct current conversion module electrically connected to the high-voltage power supply bus does not connect to mains, causing that the high-voltage power supply bus is to be off), the first direct current/direct current conversion module may be used to perform voltage conversion on a high-voltage direct current carried by the other high-voltage power supply bus of the pair of high-voltage power supply buses, and the first direct current/direct current conversion module outputs a converted high-voltage direct current to the high-voltage power supply bus that is to be off in order to ensure that the high-voltage power supply bus powers a load on it without interruption.

BRIEF DESCRIPTION OF DRAWINGS

To describe the technical solutions in the embodiments of the present disclosure more clearly, the following briefly introduces the accompanying drawings required for describing the embodiments or the prior art. The accompanying drawings in the following description show merely some embodiments of the present disclosure, and a person of ordinary skill in the art may still derive other drawings from these accompanying drawings without creative efforts.

DESCRIPTION OF EMBODIMENTS

Figure 1:
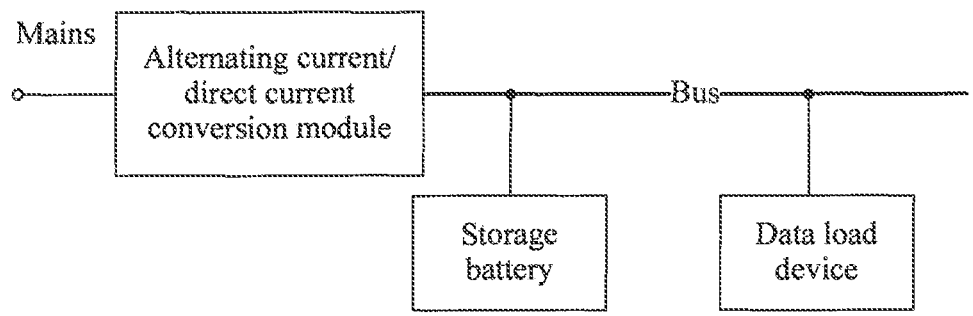
FIG. 1 is a block diagram of a high-voltage direct current power supply circuit in the prior art described in background.
Figure 2:
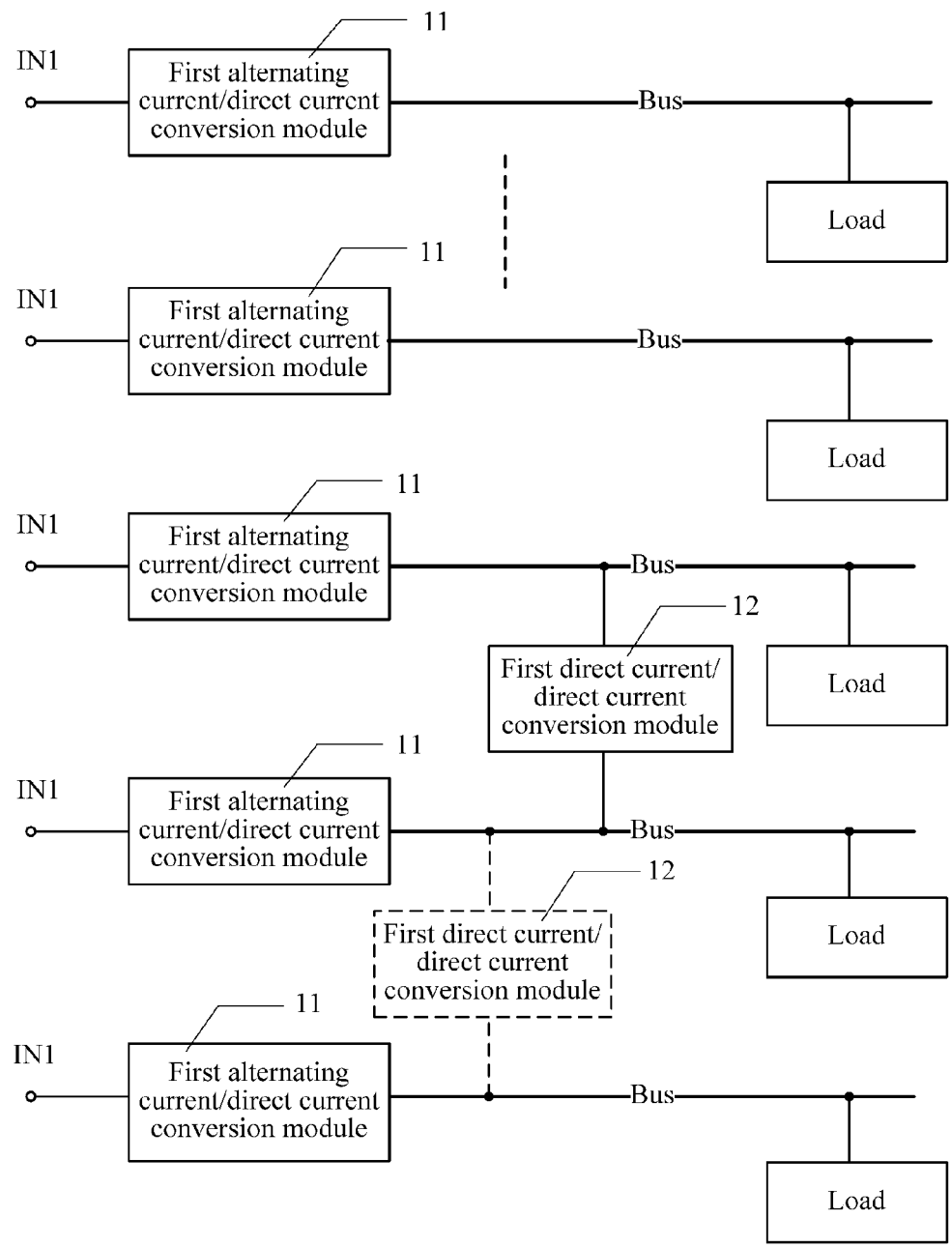
FIG. 2 is a structural diagram of composition of a power supply bus circuit according to an embodiment of the present disclosure.

To make the objectives, technical solutions, and advantages of the present disclosure clearer and more comprehensible, the following further describes the present disclosure in detail with reference to the accompanying drawings and embodiments. It should be understood that the specific embodiments described herein are merely used to explain the present disclosure but are not intended to limit the present disclosure. The technical solution according to the present disclosure is described with reference to specific embodiments as follows FIG. 2 shows a composition structure of a power supply bus circuit according to an embodiment of the present disclosure. For ease of description, only parts related to this embodiment of the present disclosure are illustrated.

Referring to FIG. 2, the power supply bus circuit provided by this embodiment of the present disclosure includes a high-voltage power supply circuit. The high-voltage power supply circuit includes at least two first alternating current/direct current conversion modules 11 and further includes at least two high-voltage direct current power supply buses. The first alternating current/direct current conversion module 11 has a first mains end IN1, and one first alternating current/direct current conversion module 11 is electrically connected to one high-voltage direct current power supply bus, and the first alternating current/direct current conversion module 11 connects to mains using the first mains end IN1, adjusts the connected mains into a high-voltage direct current, and outputs the high-voltage direct current to the high-voltage direct current power supply bus that is electrically connected to the first alternating current/direct current conversion module.

In this embodiment of the present disclosure, the high-voltage power supply circuit includes M first alternating current/direct current conversion modules 11, where M is greater than or equal to 2. Correspondingly, the high-voltage power supply circuit further includes M high-voltage direct current power supply buses. Each first alternating current/direct current conversion module 11 is correspondingly connected to one high-voltage direct current power supply bus. For a first alternating current/direct current conversion module 11, if the first alternating current/direct current conversion module 11 connects to mains using its first mains end IN1, the first alternating current/direct current conversion module 11 adjusts the connected mains into a high-voltage direct current, and outputs the high-voltage direct current through a high-voltage direct current power supply bus. When one or more loads are mounted on the high-voltage direct current power supply bus, the one or more loads may be driven by the high-voltage direct current on the high-voltage direct current power supply bus. As a specific implementation manner, one or more loads are mounted on the high-voltage direct current power supply bus, and each load requires a same voltage. Therefore, a voltage may be set for the first alternating current/direct current conversion module 11 electrically connected to the high-voltage direct current power supply bus, and the voltage may be set to a voltage that is commonly required by each load. It should be noted that a manner of setting a voltage is not limited herein. The voltage may be set manually (for example, a value is manually entered using a key provided by the first alternating current/direct current conversion module 11) or in another smart manner (for example, an electronic circuit is triggered to generate a voltage value that needs to be set, or for another example, it is triggered in a software control manner to generate a voltage value that needs to be set), likewise, for different high-voltage direct current power supply buses, voltages may be set for first alternating current/direct current conversion modules 11 regarding voltages required by loads mounted on the high-voltage direct current power supply buses. In this way, different first alternating current/direct current conversion modules 11 may output high-voltage direct currents with different voltages, and power loads on high-voltage direct current power supply buses using the high-voltage direct current power supply buses electrically connected to the first alternating current/direct current conversion modules 11.

It should be noted that in this embodiment of the present disclosure, the load includes a device that needs to consume electrical power, such as an automation device, a data load device, or a network device.

It should be emphasized that the high-voltage power supply circuit further includes at least one first direct current/direct current conversion module 12. one first direct current/direct current conversion module 12 is electrically connected between two high-voltage direct current power supply buses, and the first direct current/direct current conversion module 12 performs voltage conversion on a high-voltage direct current between the two high-voltage direct current power supply buses that are connected to the first direct current/direct current conversion module in order to implement mutual backup of power supplies between the two high-voltage direct current power supply buses.

In this embodiment of the present disclosure, if mutual backup of power supplies needs to be implemented for two high-voltage direct current power supply buses, one first direct current/direct current conversion module 12 is electrically connected between the two high-voltage direct current power supply buses, likewise, if mutual backup of power supplies needs to be implemented for three high-voltage direct current power supply buses, one first direct current/direct current conversion module 12 needs to be electrically connected between every two high-voltage direct current power supply buses. Therefore, if mutual backup needs to be implemented between every two of three high-voltage direct current power supply buses, three first direct current/direct current conversion modules 12 are required, where one first direct current/direct current conversion module 12 is electrically connected between two high-voltage direct current power supply buses. Likewise, high-voltage direct current power supply buses requiring mutual backup of power supplies may be determined in advance, and two high-voltage direct current power supply buses requiring mutual backup of power supplies may be considered as one pair of high-voltage direct current power supply buses. For each pair of determined high-voltage direct current power supply buses, one first direct current/direct current conversion module 12 is connected in series to electrically connect the pair of high-voltage direct current power supply buses.

For a first direct current/direct current conversion module 12 electrically connected between two high-voltage direct current power supply buses that are used as mutual backup of power supplies, if one high-voltage direct current power supply bus is off (for example, a first alternating current/direct current conversion module 11 supplying power to the high-voltage direct current power supply bus is faulty, and/or a high-voltage backup power supply 14 electrically connected to the high-voltage direct current power supply bus is faulty), the first direct current/direct current conversion module 12 performs voltage conversion on a high-voltage direct current of the other high-voltage direct current power supply bus to obtain a matching high-voltage direct current (that is, a high-voltage direct current required by a load mounted on the off high-voltage direct current power supply bus).

In this embodiment of the present disclosure, a first direct current/direct current conversion module 12 is electrically connected to two high-voltage direct current power supply buses, and voltages of high-voltage direct currents respectively carried by the two high-voltage direct current power supply buses may be the same or different. Generally, a voltage carried by each high-voltage direct current power supply bus depends on a voltage required by a load mounted on the high-voltage direct current power supply bus. Then, a voltage of a first alternating current/direct current conversion module 11 electrically connected to the high-voltage direct current power supply bus is adjusted and controlled such that the first alternating current/direct current conversion module 11 outputs a determined voltage to the high-voltage direct current power supply bus electrically connected to the first alternating current/direct current conversion module in order to supply, using the high-voltage direct current power supply bus, matching power to the load mounted on the high-voltage direct current power supply bus. Therefore, in most cases, voltages carried by different high-voltage direct current power supply buses are different. In this embodiment of the present disclosure, one first direct current/direct current conversion module 12 is added between two high-voltage direct current power supply buses requiring mutual backup of power supplies, where the first direct current/direct current conversion module 12 has a function of mutual conversion between different voltages, may convert a high-voltage direct current with a first specified voltage on one high-voltage direct current power supply bus into a high-voltage direct current with a second specified voltage on the other high-voltage direct current power supply bus, and may convert the high-voltage direct current with the second specified voltage on the other high-voltage direct current power supply bus into the high-voltage direct current with the first specified voltage on the one high-voltage direct current power supply bus. As a specific composition structure of the first direct current/direct current conversion module 12, the first direct current/direct current conversion module 12 has two sub-voltage conversion modules, where one sub-voltage conversion module is configured to, after one high-voltage direct current power supply bus is off, convert a high-voltage direct current with a second specified voltage on the other high-voltage direct current power supply bus into a high-voltage direct current with a first specified voltage on the one high-voltage direct current power supply bus, and the other sub-voltage conversion module is configured to, after the other high-voltage direct current power supply bus is off, convert the high-voltage direct current with the first specified voltage on the one high-voltage direct current power supply bus into the high-voltage direct current with the second specified voltage on the other high-voltage direct current power supply bus. After one of the high-voltage direct current power supply buses is off, the two sub-voltage conversion modules of the first direct current/direct current conversion module 12 are used to perform voltage conversion to continuously power the off high-voltage direct current power supply bus in order to implement mutual backup of power supplies between the two high-voltage direct current power supply buses.

As an implementation manner of the present disclosure, for a first alternating current/direct current conversion module 11 electrically connected to a high-voltage direct current power supply bus, if the first alternating current/direct current conversion module 11 does not connect to mains using its first mains end IN1, but the high-voltage direct current power supply bus is electrically connected to another high-voltage direct current power supply bus through a first direct current/direct current conversion module 12, the high-voltage direct current power supply bus may acquire, from the first direct current/direct current conversion module 12, a high-voltage direct current obtained by performing voltage conversion, where the acquired high-voltage direct current is obtained by the first direct current/direct current conversion module 12 by performing voltage conversion on a current of another high-voltage direct current power supply bus. It should be noted that the other high-voltage direct current power supply bus may be one or more high-voltage direct current power supply buses, but each high-voltage direct current power supply bus needs to be separately electrically connected to the high-voltage direct current power supply bus through one first direct current/direct current conversion module 12. Therefore, when the first alternating current/direct current conversion module 11 electrically connected to the high-voltage direct current power supply bus does not connect to mains, the high-voltage direct current power supply bus may still acquire, through the first direct current/direct current conversion module 12 electrically connected to the high-voltage direct current power supply bus, a high-voltage direct current obtained by voltage conversion in order to power a load mounted on the high-voltage direct current power supply bus.

As an implementation manner of the present disclosure, if one or more loads on a high-voltage direct current power supply bus require high power to operate, more high-voltage direct currents need to be consumed. However, power supplied by the high-voltage power supply bus cannot meet this requirement. In addition, the high-voltage direct current power supply bus is electrically connected to another high-voltage direct current power supply bus through a first direct current/direct current conversion module 12. If a load on one or more high-voltage direct current power supply buses of the other high-voltage direct current power supply bus does not operate (basically no high-voltage direct current needs to be consumed) or operates with low power (a little high-voltage direct current is consumed), the first direct current/direct current conversion module 12 may be used to acquire a high-voltage direct current converted from another high-voltage direct current power supply bus (especially a high-voltage direct current power supply bus that basically consumes no or consumes a little high-voltage direct current), where the acquired high-voltage direct current is obtained by the first direct current/direct current conversion module 12 by performing voltage conversion on the other high-voltage direct current power supply bus. It should be noted that the other high-voltage direct current power supply bus is one or more high-voltage direct current power supply buses, but each high-voltage direct current power supply bus needs to be separately electrically connected to the high-voltage direct current power supply bus through one first direct current/direct current conversion module 12.

Figure 3:
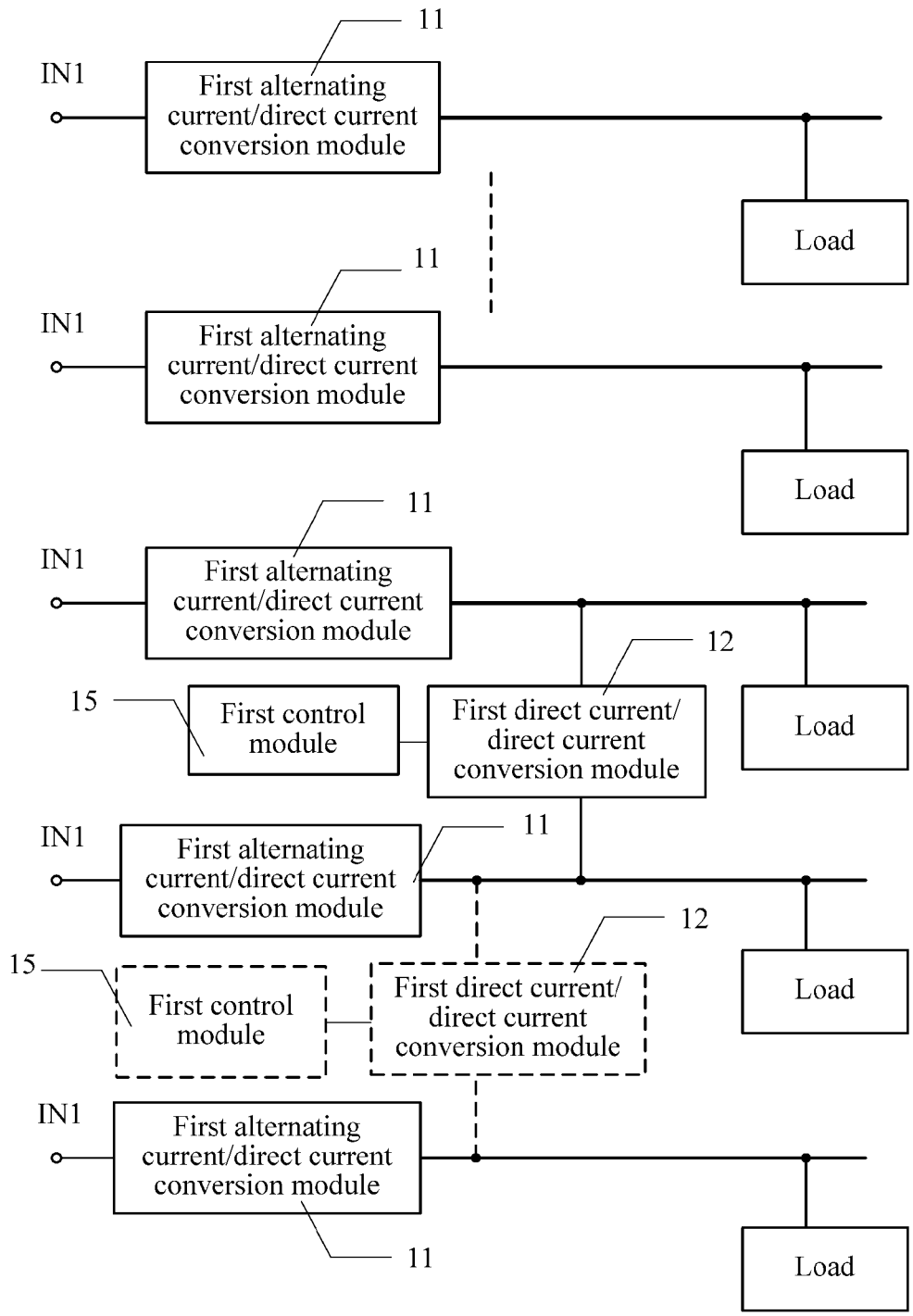
FIG. 3 is an improved structural diagram of composition based on the power supply bus circuit in FIG. 2.

As an implementation manner of the present disclosure, FIG. 3 shows an improved composition structure of a power supply bus circuit according to an embodiment of the present disclosure. For ease of description, only parts related to this embodiment of the present disclosure are illustrated.

As an improvement based on the power supply bus circuit provided in FIG. 2, referring to FIG. 3, the high-voltage power supply circuit further includes at least one first control module 15, where each first control module 15 is correspondingly connected to one first direct current/direct current conversion module 12.

For ease of description, the following definition is made for this implementation manner: two high-voltage direct current power supply buses connected to the first direct current/direct current conversion module 12 is classified into a first high-voltage direct current power supply bus and a second high-voltage direct current power supply bus.

The first control module 15 controls, when detecting that a voltage of the first high-voltage direct current power supply bus is lower than a first voltage threshold, the first direct current/direct current conversion module 12 to convert and transfer a high-voltage direct current on a second high-voltage direct current power supply bus to the first high-voltage direct current power supply bus.

In this implementation manner, a high-voltage direct current transferred by each high-voltage direct current power supply bus may be different in voltage. Therefore, in this implementation manner, a corresponding voltage threshold is respectively determined for each high-voltage direct current power supply bus. For example, a corresponding voltage threshold determined for the first high-voltage direct current power supply bus is the first voltage threshold. When a voltage of a high-voltage direct current transferred on a high-voltage direct current power supply bus is lower than a corresponding voltage threshold, it indicates that electrical energy on the high-voltage direct current power supply bus is insufficient. In this case, the first control module 15 in this implementation manner controls a direction of voltage conversion on the first direct current/direct current conversion module 12 and controls the first direct current/direct current conversion module 12 to perform voltage conversion on a high-voltage direct current on the second high-voltage direct current power supply bus, and output a voltage-converted high-voltage direct current to the first high-voltage direct current power supply bus in order to supplement electrical energy on the first high-voltage direct current power supply bus such that the voltage on the first high-voltage direct current power supply bus is restored to be higher than the first voltage threshold.

Similarly, when a voltage of a high-voltage direct current transferred by the second high-voltage direct current power supply bus is lower than a corresponding voltage threshold, the first control module 15 controls a direction of voltage conversion in the first direct current/direct current conversion module 12 to perform voltage conversion on the high-voltage direct current on the first high-voltage direct current power supply bus, and output a voltage-converted high-voltage direct current to the second high-voltage direct current power supply bus to supplement electrical energy on the second high-voltage direct current power supply bus such that the voltage on the second high-voltage direct current power supply bus is restored to be higher than the corresponding voltage threshold.

Figure 4:
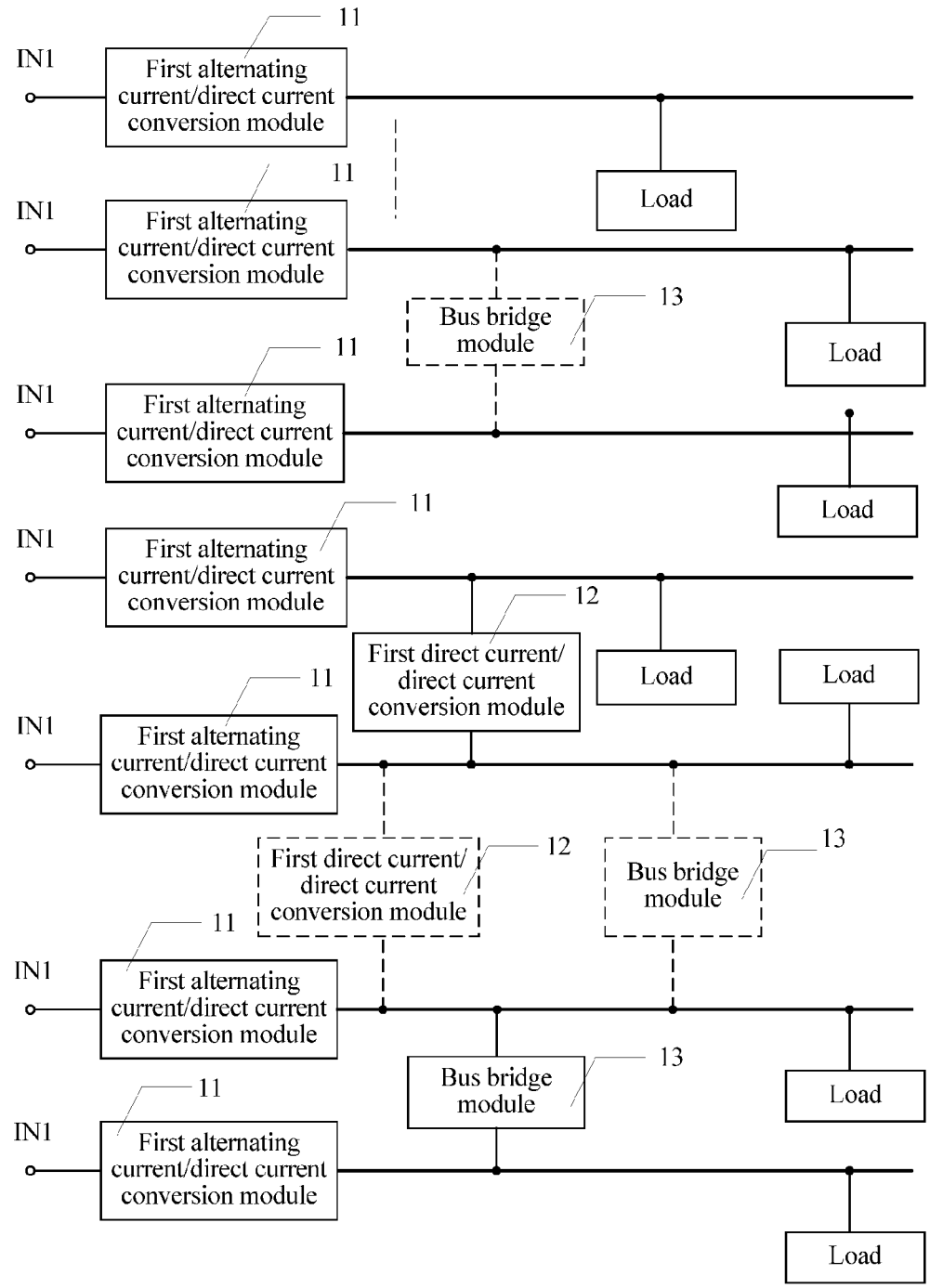
FIG. 4 is another improved structural diagram of composition of a power supply bus circuit according to an embodiment of the present disclosure.

FIG. 4 shows an improved composition structure of a power supply bus circuit according to an embodiment of the present disclosure. For ease of description, only parts related to this embodiment of the present disclosure are illustrated.

As an improvement based on the power supply bus circuit provided in FIG. 2, as a preferred embodiment of the present disclosure, referring to FIG. 4, multiple first direct current/direct current conversion modules 12 included by the high-voltage power supply circuit are first conversion modules of a same type. The high-voltage power supply circuit further includes at least one bus bridge module 13, and one bus bridge module 13 is electrically connected between two high-voltage direct current power supply buses that are correspondingly connected to two first conversion modules. The bus bridge module 13 shorts out, when a close instruction is detected, the two high-voltage direct current power supply buses electrically connected to the bus bridge module, and breaks, when an open instruction is detected, a short circuit between the two high-voltage direct current power supply buses electrically connected to the bus bridge module.

In this preferred embodiment, for loads separately mounted on multiple high-voltage direct current power supply buses that are used as mutual backup of power supplies, if voltages required by the separately mounted loads are the same (that is, voltages of high-voltage direct currents carried by the high-voltage direct current power supply buses that are used as mutual backup of power supplies are the same, namely, multiple first direct current/direct current conversion modules 12 correspondingly connected to the high-voltage direct current power supply buses are of the same type, and voltages of high-voltage direct currents output by the multiple first direct current/direct current conversion modules 12 of the same type are the same), one bus bridge module 13 may be added between every two high-voltage direct current power supply buses (which carry high-voltage direct currents of a same voltage) that are used as mutual backup of power supplies.

In a specific implementation manner of this preferred embodiment, the bus bridge module 13 is a mechanical switch, an electrically controlled switch, an electronic switch, or another switch. In this implementation manner, a mechanical switch may be manually controlled to break or close a short circuit between two high-voltage direct current power supply buses electrically connected to the mechanical switch. In this implementation manner, if the bus bridge module 13 is an electrically controlled switch, an electronic switch, or another controllable switch, the bus bridge module 13 shorts out, when a close instruction is detected, the two high-voltage direct current power supply buses electrically connected to the bus bridge module 13, and the bus bridge module 13 breaks, when an open instruction is detected, a short circuit between the two high-voltage direct current power supply buses electrically connected to the bus bridge module 13.

In a specific implementation manner of this preferred embodiment, the bus bridge module 13 is a circuit that can control two high-voltage direct current power supply buses to be closed or open. In this implementation manner, the bus bridge module 13 shorts out, when a close instruction is detected, the two high-voltage direct current power supply buses electrically connected to the bus bridge module 13, and the bus bridge module 13 breaks, when an open instruction is detected, a short circuit between the two high-voltage direct current power supply buses electrically connected to the bus bridge module 13.

In this preferred embodiment, a manner of triggering a close instruction or an open instruction includes but is not limited to, first, manual triggering, for example, a control button switch provided by the bus bridge module 13 is manually operated to trigger a close instruction or an open instruction, and second, an electronic circuit or software generates a close instruction or an open instruction, and sends the generated close instruction or open instruction to the bus bridge module 13. The bus bridge module 13 shorts out, when a close instruction is received, the two high-voltage direct current power supply buses electrically connected to the bus bridge module 13, and the bus bridge module 13 breaks, when an open instruction is received, a short circuit between the two high-voltage direct current power supply buses electrically connected to the bus bridge module 13.

It should be noted that, a first direct current/direct current conversion module 12, a bus bridge module 13, or both a first direct current/direct current conversion module 12 and a bus bridge module 13 may be added between high-voltage direct current power supply buses that are used as mutual backup of power supplies and carry a same voltage. Voltage conversion and/or shorting out may be correspondingly performed between high-voltage direct current power supply buses as long as a first direct current/direct current conversion module 12 and/or a bus bridge module 13 are/is added between the high-voltage direct current power supply buses that are used as mutual backup of power supplies and carry the same voltage. However, it should be noted that for mutual backup of power supplies between high-voltage direct current power supply buses carrying a same voltage, compared with that a first direct current/direct current conversion module 12 is electrically connected between the high-voltage direct current power supply buses carrying the same voltage, because the first direct current/direct current conversion module 12 requires some time to perform voltage conversion and energy loss exists in the voltage conversion, a bus bridge module 13 is electrically connected between the high-voltage direct current power supply buses carrying the same voltage, and the bus bridge module 13 can directly short out two high-voltage direct current power supply buses carrying a same voltage almost without delay or loss, thereby more efficiently implementing mutual backup of power supplies between the two high-voltage direct current power supply buses carrying the same voltage.

Figure 5:
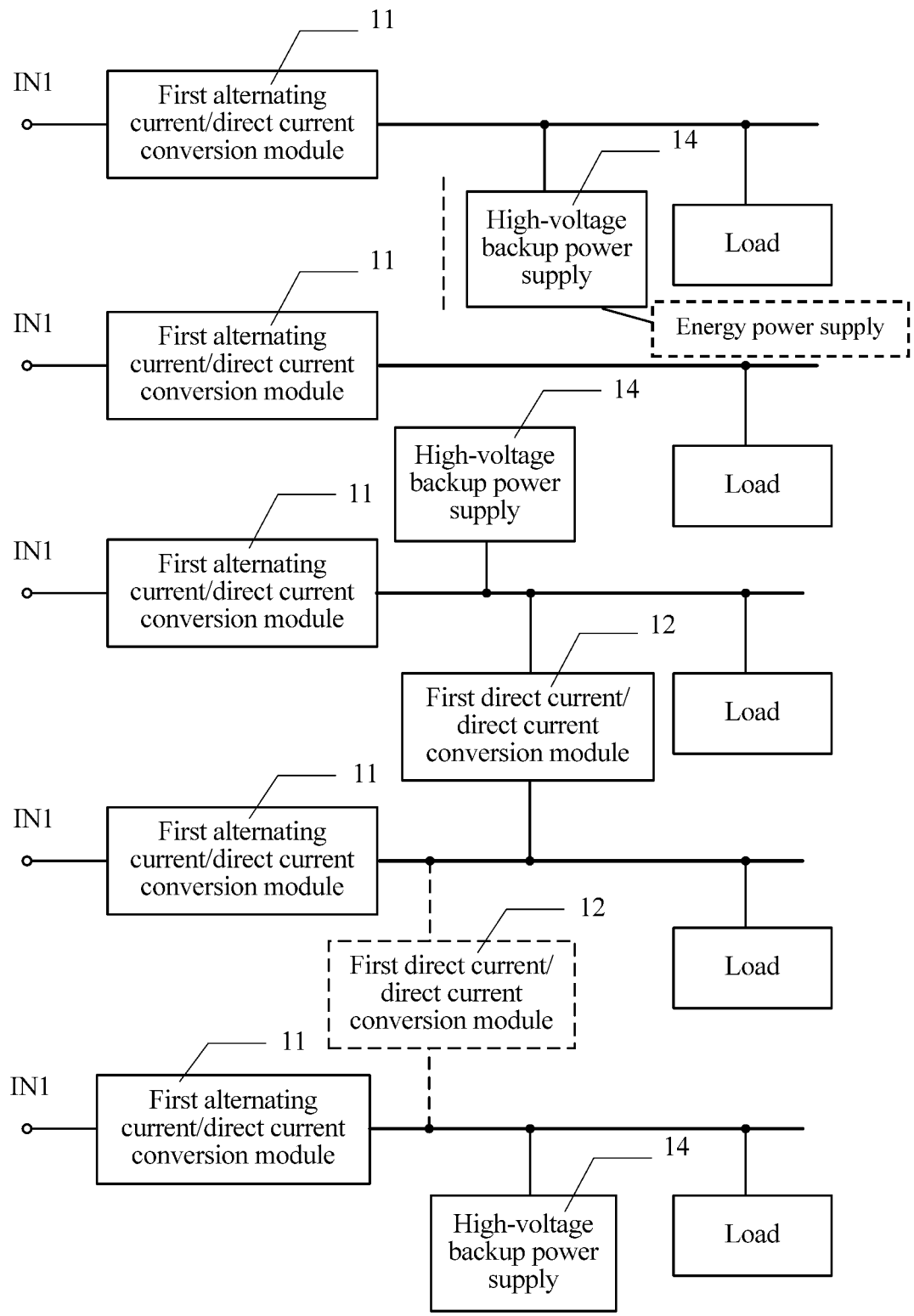
FIG. 5 is another improved structural diagram of composition of a power supply bus circuit according to an embodiment of the present disclosure.

FIG. 5 shows another improved composition structure of a power supply bus circuit according to an embodiment of the present disclosure. For ease of description, only parts related to this embodiment of the present disclosure are illustrated.

As a preferred embodiment of the present disclosure, referring to FIG. 5, the high-voltage power supply circuit further includes at least one high-voltage backup power supply 14, and one high-voltage direct current power supply bus is electrically connected to one or more high-voltage backup power supplies 14.

In this preferred embodiment, in order to further prevent a high-voltage direct current power supply bus from becoming off abnormally, one or more high-voltage backup power supplies 14 may be directly electrically connected to the high-voltage direct current power supply bus. In addition, if there are one or more high-voltage direct current power supply buses that are used as mutual backup of power supplies for the high-voltage direct current power supply bus, that is, the high-voltage direct current power supply bus is separately electrically connected to one or more high-voltage direct current power supply buses through one or more first direct current/direct current conversion modules 12, one or more high-voltage backup power supplies 14 may also be electrically connected to the one or more high-voltage direct current power supply buses that are used as mutual backup of power supplies, where the high-voltage backup power supplies 14 may, while being used as a backup power supply for the high-voltage direct current power supply bus that is used as a mutual backup of power supplies, also be used as a backup power supply for the high-voltage direct current power supply bus using the first direct current/direct current conversion module 12. Certainly, a high-voltage backup power supply 14 may also be electrically connected to each high-voltage direct current power supply bus.

In this preferred embodiment, among multiple high-voltage direct current power supply buses electrically connected to a first direct current/direct current conversion module 12, a high-voltage backup power supply 14 may be selectively added to one or more high-voltage direct current power supply buses such that power supply backup may be implemented for the multiple high-voltage direct current power supply buses electrically connected to the first direct current/direct current conversion module 12 using the added high-voltage backup power supply 14. When mains is off, which causes a high-voltage direct current power supply bus to be off, the high-voltage backup power supply 14 is used to power the multiple high-voltage direct current power supply buses electrically connected to the first direct current/direct current conversion module 12 such that loads on the high-voltage direct current power supply buses can be powered without interruption to ensure proper operation of the loads.

As a preferred implementation manner of the present disclosure, the high-voltage backup power supply 14 includes one or more rechargeable power supplies. Correspondingly, one high-voltage direct current power supply bus is electrically connected to one or more rechargeable power supplies, and the rechargeable power supplies are charged or discharge through the high-voltage direct current power supply bus that is connected to the rechargeable power supplies. In this preferred implementation manner, one or more rechargeable power supplies may be added separately to one or more high-voltage direct current power supply buses.

In this preferred implementation manner, the rechargeable power supply may be a rechargeable battery having a capability of discharging a high current, such as a storage battery.

Further, for a rechargeable power supply electrically connected to a high-voltage direct current power supply bus, when a first alternating current/direct current conversion module 11 electrically connected to the high-voltage direct current power supply bus continuously outputs a high-voltage direct current to the high-voltage direct current power supply bus, the rechargeable power supply may be charged through the high-voltage direct current power supply bus while the high-voltage direct current power supply bus drives a load to operate. If the high-voltage direct current power supply bus becomes off abnormally, the rechargeable power supply may discharge to the load through the high-voltage direct current power supply bus in order to achieve an effect of driving the load without interruption to operate. In addition, if one or more high-voltage direct current power supply buses electrically connected to the high-voltage direct current power supply bus through a first direct current/direct current conversion module 12 also become off abnormally, when discharging to the load through the high-voltage direct current power supply bus, the rechargeable power supply also powers the one or more high-voltage direct current power supply buses that are electrically connected though the first direct current/direct current conversion module 12 and that become off abnormally in order to drive loads on the one or more high-voltage direct current power supply buses that become off abnormally to operate, thereby achieving an effect of driving the load without interruption to operate.

As a preferred implementation manner of the present disclosure, the high-voltage backup power supply 14 includes one or more new energy power supplies. One high-voltage direct current power supply bus is electrically connected to one or more new energy power supplies, and the new energy power supplies discharge through the high-voltage direct current power supply bus that is connected to the new energy power supplies.

In this preferred implementation manner, one or more new energy power supplies may be added separately to one or more high-voltage direct current power supply buses. Preferably, the new energy power supply includes but is not limited to a power supply made by a renewable energy resource, such as a solar energy power supply, a wind energy power supply, a geothermal energy power supply, an ocean energy power supply, a biological energy power supply, and a nuclear fusion reaction energy power supply.

In this preferred implementation manner, for one or more new energy power supplies electrically connected to a high-voltage direct current power supply bus, if the high-voltage direct current power supply bus becomes off abnormally, the one or more new energy power supplies output a high-voltage direct current to the high-voltage direct current power supply bus to discharge to a load through the high-voltage direct current power supply bus in order to achieve an effect of driving the load without interruption to operate. In addition, if one or more high-voltage direct current power supply buses electrically connected to the high-voltage direct current power supply bus through a first direct current/ direct current conversion module 12 also become off abnormally, when discharging to the load through the high-voltage direct current power supply bus, the one or more new energy power supplies also power the one or more high-voltage direct current power supply buses that are electrically connected though the first direct current/direct current conversion module 12 and that become off abnormally in order to drive loads on the one or more high-voltage direct current power supply buses that become off abnormally to operate, thereby achieving an effect of driving the load without interruption to operate.

Figure 6:
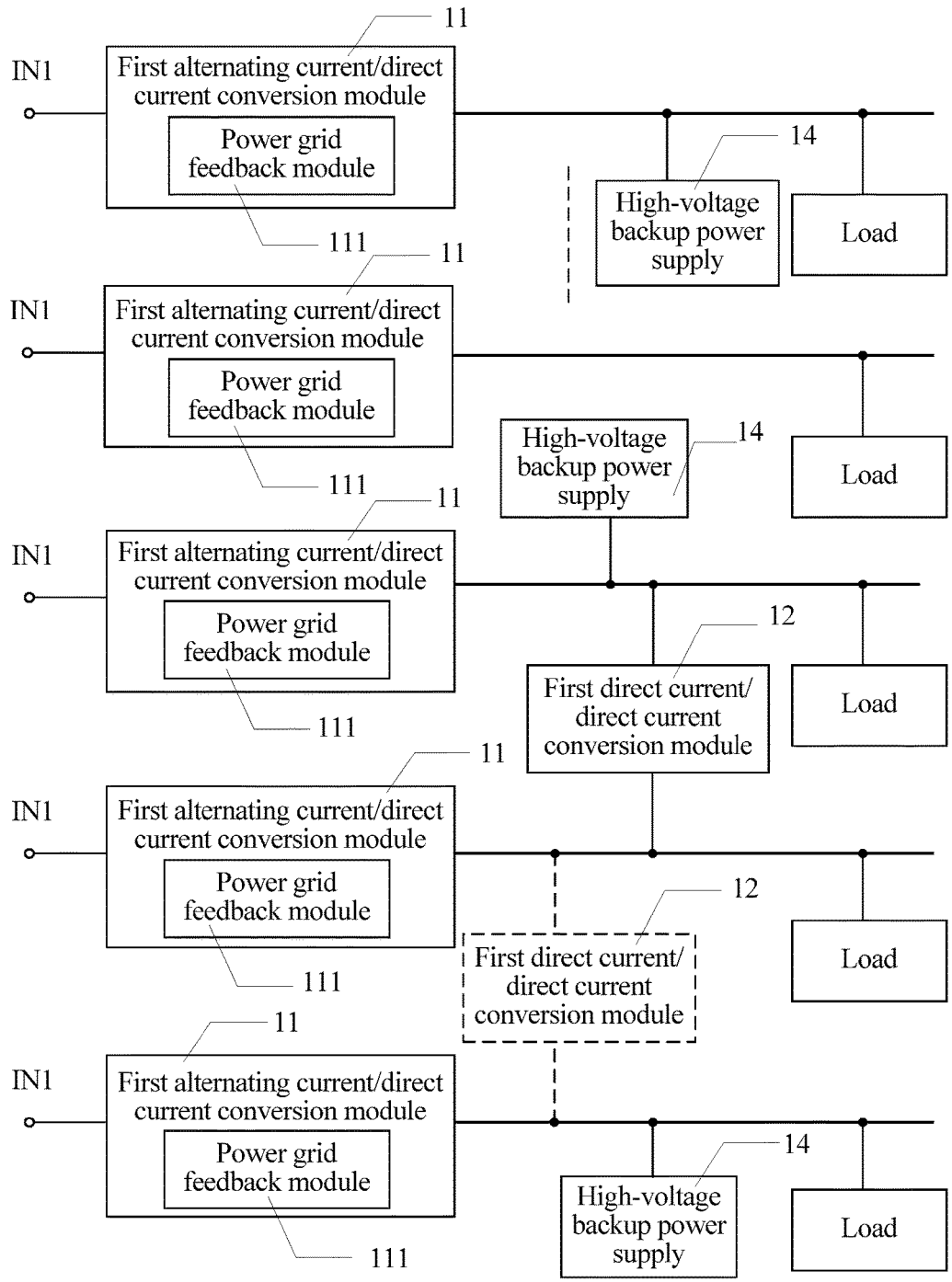
FIG. 6 is an improved structural diagram of composition based on the power supply bus circuit provided in FIG. 5.

FIG. 6 shows another improved composition structure of a power supply bus circuit according to an embodiment of the present disclosure. For ease of description, only parts related to this embodiment of the present disclosure are illustrated.

As an improvement based on the power supply bus circuit provided in FIG. 5, as a preferred implementation manner of the present disclosure, referring to FIG. 6, the first alternating current/direct current conversion module 11 includes a power grid feedback module 111.

The power grid feedback module 111 included by the first alternating current/direct current conversion module 11 receives, when the high-voltage backup power supply 14 discharges, a high-voltage direct current from the high-voltage direct current power supply bus that is connected to the first alternating current/direct current conversion module 11, inverts the received high-voltage direct current into an alternating current, and outputs the alternating current through the first mains end IN1 of the first alternating current/direct current conversion module 11. Therefore, an alternating current output by the first mains end IN1 of the first alternating current/direct current conversion module 11 is transferred as mains.

In this preferred implementation manner, the high-voltage backup power supply 14 is a power supply capable of discharging a high current. In a normal case, if the high-voltage backup power supply 14 includes a rechargeable power supply, the rechargeable power supply on the high-voltage backup power supply 14 may be charged through a high-voltage direct current power supply bus to store electrical energy. However, when a current of mains connected by the first alternating current/direct current conversion module 11 is extremely low, the rechargeable power supply inversely discharges a high current to mains through the high-voltage direct current power supply bus in order to increase a power current of the mains and improve a high-current endurance capability of the mains.

In addition, if the high-voltage backup power supply 14 includes a new energy power supply, in a period in which the new energy power supply has a strong high-current capability, the new energy power supply inversely discharges a high current to mains through the high-voltage direct current power supply bus to improve a power capability of the mains. Because the mains generally is powered by a non-renewable resource (such as coal), the new energy power supply can reduce consumption of the non-renewable resource and reduce a power generation cost for purchasing the non-renewable resource. Because the new energy power supply is powered using a renewable resource, and a process of generating power using the renewable resource and power generation residues are healthy and sanitary, it is the first choice to power a load on a high-voltage direct current power supply bus using the new energy power supply and to invert into mains using the power grid feedback module 111, which is beneficial to the sustained and healthy development of human beings.

Figure 7:
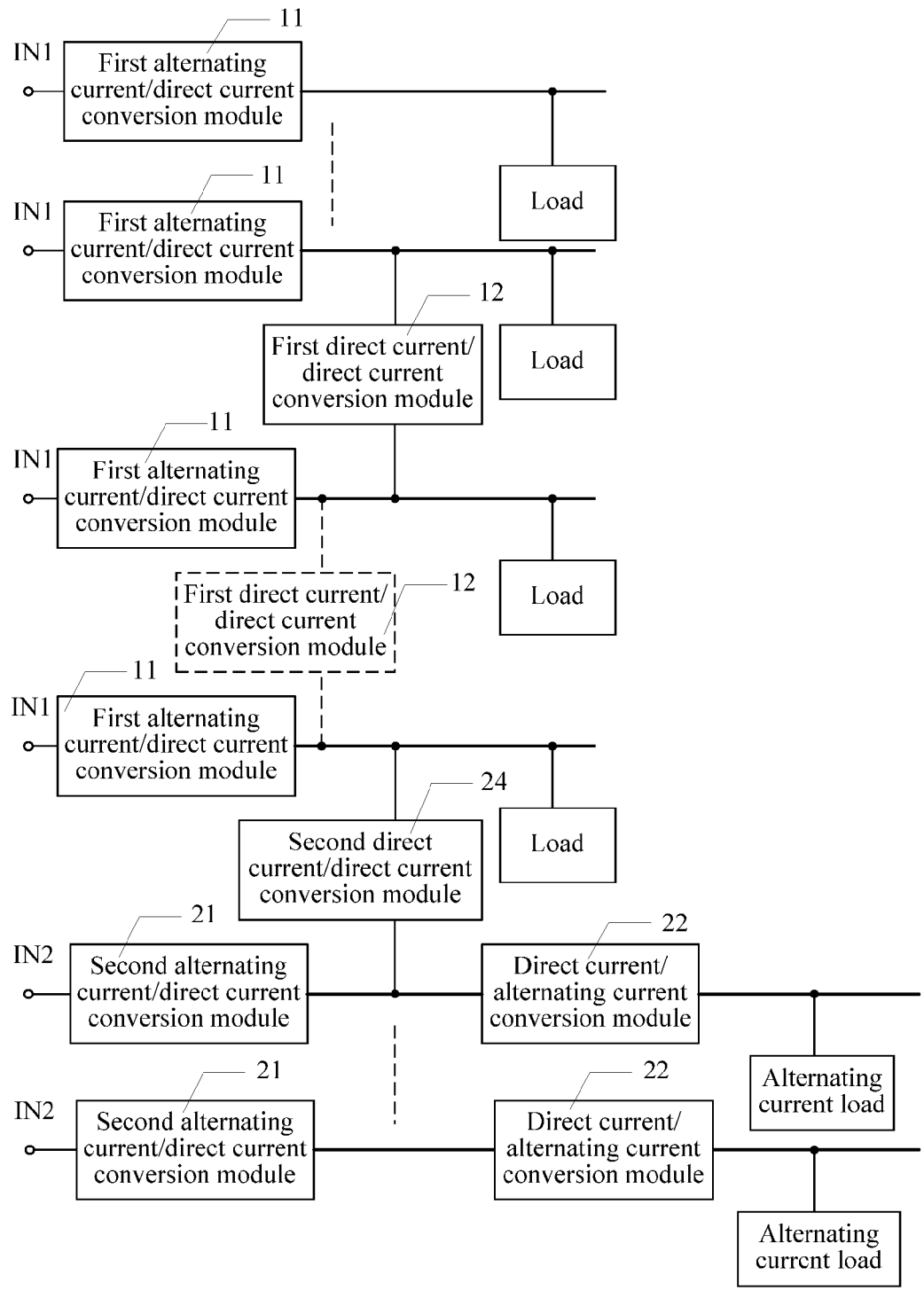
FIG. 7 is another improved structural diagram of composition of a power supply bus circuit according to an embodiment of the present disclosure.

FIG. 7 shows another improved composition structure of a power supply bus circuit according to an embodiment of the present disclosure. For ease of description, only parts related to this embodiment of the present disclosure are illustrated.

As a preferred embodiment of the present disclosure, referring to FIG. 7, the power supply bus circuit further includes one or more UPS power supply circuits. The UPS power supply circuit includes a second alternating current/direct current conversion module 21, a UPS direct current bus, and a direct current/alternating current conversion module 22. The UPS direct current bus is electrically connected between the second alternating current/direct current conversion module 21 and the direct current/alternating current conversion module 22. The second alternating current/direct current conversion module 21 has a second mains end IN2, and the second alternating current/direct current conversion module 21 connects to mains using the second mains end IN2, adjusts the connected mains into a direct current, and outputs the direct current to the UPS direct current bus that is electrically connected to the second alternating current/direct current conversion module.

In this preferred embodiment, as a relatively mature power supply technology, a UPS power supply technology includes the second alternating current/direct current conversion module 21 and the direct current/alternating current conversion module 22, in which mains is converted into a direct current using the second alternating current/direct current conversion module 21, and then the direct current is converted by the direct current/alternating current conversion module 22 into an alternating current required by an alternating current load. It should be noted that in a conversion process using two steps of conversion circuits for converting an alternating current into a direct current (implemented by the second alternating current/direct current conversion module 21) and for converting the direct current into an alternating current (implemented by the direct current/alternating current conversion module 22), an influence of a harmonic wave carried by mains can be eliminated such that the alternating current required by the alternating current load can be obtained by means of conversion.

It should be emphasized that the power supply bus circuit further includes one or more second direct current/direct current conversion module 24. One second direct current/direct current conversion module 24 is electrically connected between one high-voltage direct current power supply bus and the UPS direct current bus, and the second direct current/direct current conversion module 24 performs voltage conversion between the high-voltage direct current power supply bus connected to the second direct current/direct current conversion module and the UPS direct current bus connected to the second direct current/direct current conversion module.

In this preferred embodiment, an alternating current between multiple UPS power supply circuits provided by the prior art, especially an alternating current provided by each UPS power supply circuit, is determined for a different alternating current load. Therefore, mutual backup of power supplies cannot be implemented between the multiple UPS power supply circuits in the prior art. However, in this preferred embodiment, for the foregoing case, the second direct current/direct current conversion module 24 is used to electrically connect the high-voltage direct current power supply bus and the UPS direct current bus, and the second direct current/direct current conversion module 24 can perform voltage conversion on the high-voltage direct current power supply bus to obtain a direct current, and transfer a voltage-converted direct current through the UPS direct current bus, and the second direct current/direct current conversion module 24 can further perform voltage conversion on a direct current transferred by the UPS direct current bus to obtain a high-voltage direct current, and transfer a voltage-converted high-voltage direct current through the high-voltage direct current power supply bus. Therefore, mutual backup of power supplies may be implemented between the high-voltage direct current power supply bus and the UPS direct current bus that are electrically connected by the second direct current/direct current conversion module 24. It should be noted that one second direct current/direct current conversion module 24 can be used to establish an electrical connection between one high-voltage direct current power supply bus and one UPS direct current bus. If multiple UPS direct current buses are expected to be used as mutual backup of power supplies for one high-voltage direct current power supply bus, one second direct current/direct current conversion module 24 may be used to separately establish an electrical connection between the high-voltage direct current power supply bus and each UPS direct current bus. In this way, if each UPS power supply circuit has one UPS direct current bus, mutual backup of power supplies between multiple UPS power supply circuits and one high-voltage direct current power supply bus may be implemented. Certainly, if each UPS power supply circuit has a UPS direct current bus, and each UPS direct current bus is expected to be separately used as mutual backup of power supplies for a different high-voltage direct current power supply bus, each UPS direct current bus may be correspondingly connected to one high-voltage direct current power supply bus separately through one second direct current/direct current conversion module 24.

Further, for the direct current/alternating current conversion module 22 in the UPS power supply circuit, the direct current/alternating current conversion module 22 receives a direct current from a UPS direct current bus electrically connected to the direct current/alternating current conversion module 22 and converts the received direct current into an alternating current in order to power an alternating current load using the alternating current obtained by means of conversion. It should be noted that the direct current received by the direct current/alternating current conversion module 22 from the UPS direct current bus electrically connected to the direct current/alternating current conversion module 22 is from two sources. The first source is a direct current that is obtained by the second alternating current/direct current conversion module 21 by adjusting mains, and the second source is a direct current that is obtained by the second direct current/direct current conversion module 24 by performing voltage conversion on a high-voltage direct current on the high-voltage direct current power supply bus when the second alternating current/direct current conversion module 21 outputs no direct current or outputs direct current lower than a required current.

Figure 8:
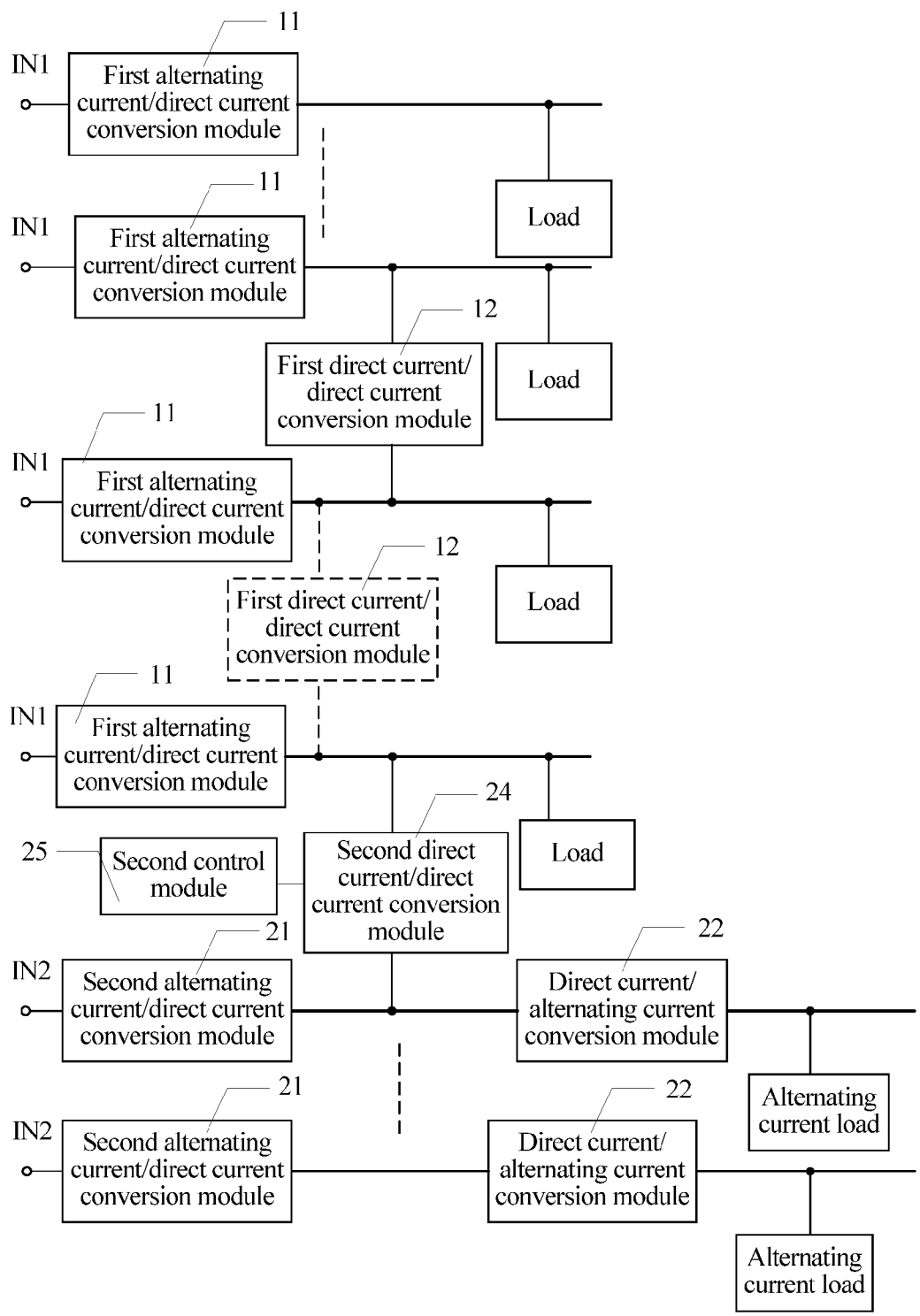
FIG. 8 is another improved structural diagram of composition based on the power supply bus circuit provided in FIG. 7.

FIG. 8 shows another improved composition structure of a power supply bus circuit according to an embodiment of the present disclosure. For ease of description, only parts related to this embodiment of the present disclosure are illustrated.

As an improvement based on the power supply bus circuit provided in FIG. 7, as a preferred implementation manner of the present disclosure, referring to FIG. 8, the high-voltage power supply circuit further includes at least one second control module 25, and each second control module 25 is correspondingly connected to one second direct current/direct current conversion module 24.

A direction of voltage conversion of each second direct current/direct current conversion module 24 is separately controlled by the second control module 25 connected to the second direct current/direct current conversion module 24.

The second control module 25 controls, when detecting that a voltage of the high-voltage direct current power supply bus is lower than a second voltage threshold, the second direct current/direct current conversion module 24 to convert and transfer a direct current on the UPS direct current bus to the high-voltage direct current power supply bus.

Furthermore, because a high-voltage direct current transferred by each high-voltage direct current power supply bus may be different in voltage, in this implementation manner, a corresponding second voltage threshold is separately determined for each high-voltage direct current power supply bus.

When a voltage of a high-voltage direct current transferred on a high-voltage direct current power supply bus connected to the second direct current/direct current conversion module 24 is lower than the corresponding second voltage threshold, it indicates that electrical energy on the high-voltage direct current power supply bus is insufficient. In this case, the second control module 25 in this implementation manner controls a direction of voltage conversion on the second direct current/direct current conversion module 24 to perform voltage conversion on a direct current on the UPS direct current bus, and output a voltage-converted high-voltage direct current to the high-voltage direct current power supply bus in order to supplement electrical energy on the high-voltage direct current power supply bus such that the voltage on the high-voltage direct current power supply bus is restored to be higher than the second voltage threshold.

The second control module 25 controls, when detecting that a voltage of the UPS direct current bus is lower than a third voltage threshold, the second direct current/direct current conversion module 24 to convert and transfer a high-voltage direct current on the high-voltage direct current power supply bus to the UPS direct current bus.

Furthermore, when a voltage of a direct current transferred on a UPS direct current bus connected to the second direct current/direct current conversion module 24 is lower than the corresponding third voltage threshold, it indicates that electrical energy on the UPS direct current bus is insufficient. In this case, the second control module 25 in this implementation manner controls a direction of voltage conversion on the second direct current/direct current conversion module 24 to perform voltage conversion on a direct current on the high-voltage direct current power supply bus, and output a voltage-converted direct current to the UPS direct current bus in order to supplement electrical energy on the UPS direct current bus such that the voltage on the UPS direct current bus is restored to be higher than the third voltage threshold.

Figure 9:
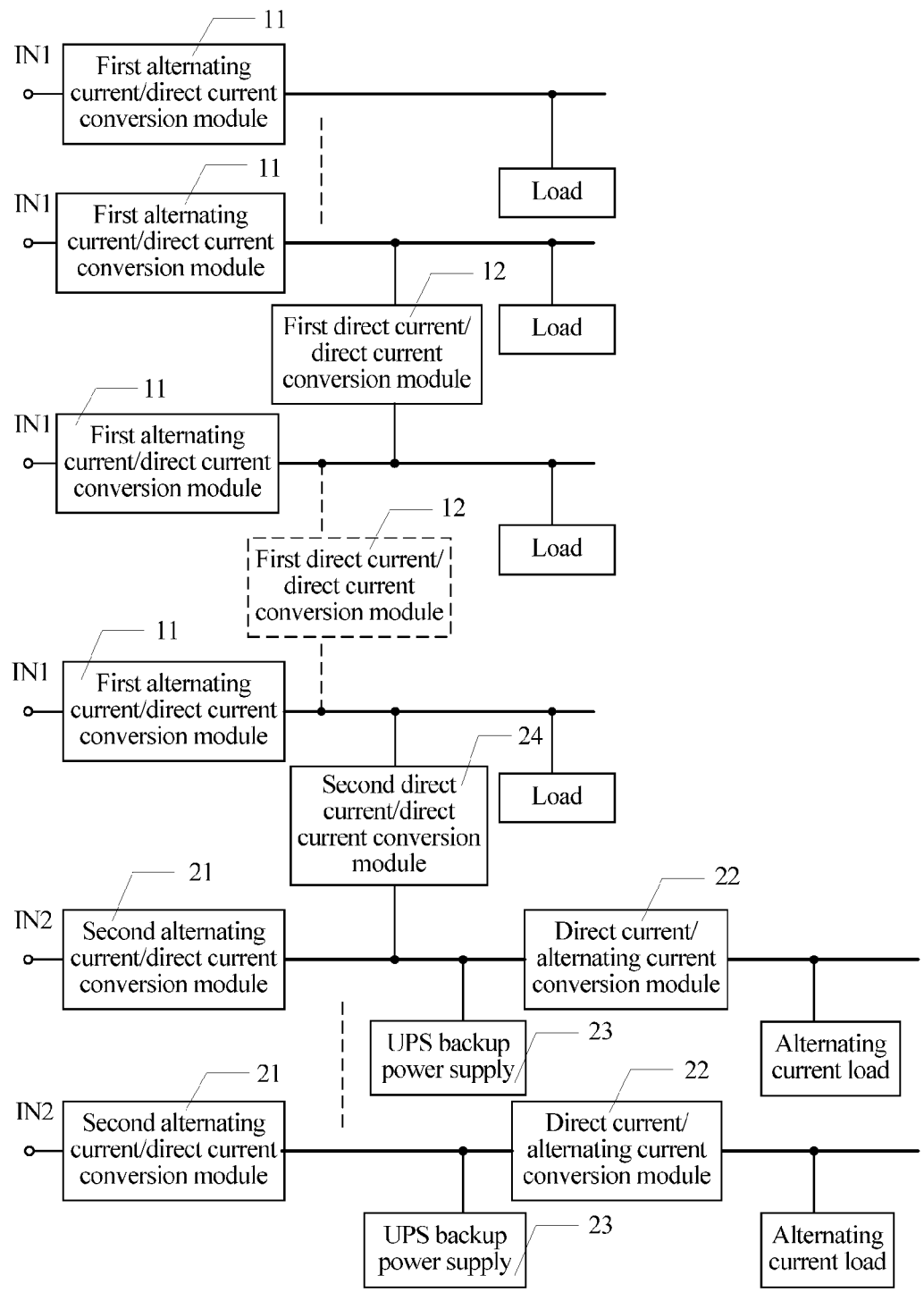
FIG. 9 is an improved structural diagram of composition based on the power supply bus circuit provided in FIG. 7.

FIG. 9 shows another improved composition structure of a power supply bus circuit according to an embodiment of the present disclosure. For ease of description, only parts related to this embodiment of the present disclosure are illustrated.

As an improvement based on the power supply bus circuit provided in FIG. 7, as a preferred implementation manner of the present disclosure, referring to FIG. 9, the UPS power supply circuit further includes at least one UPS backup power supply 23. One UPS direct current bus is electrically connected to one or more UPS backup power supplies 23, and the UPS backup power supplies 23 are charged or discharge through a direct current bus connected to the UPS backup power supplies.

In this preferred implementation manner, the UPS backup power supply 23 is a rechargeable power supply. In a process in which the second alternating current/direct current conversion module 21 in the UPS power supply circuit properly converts mains into a direct current, the second alternating current/direct current conversion module 21 continuously outputs the direct current to a direct current/alternating current conversion module 22 in the same UPS power supply circuit using the UPS direct current bus, while the direct current is output to the direct current/alternating current conversion module 22 in the same UPS power supply circuit using the UPS direct current bus, the UPS direct current bus is also used to charge the UPS backup power supply 23.

Further, when a current on the UPS direct current bus is relatively low, or when the second alternating current/direct current conversion module 21 does not connect to mains (that is, the second alternating current/direct current conversion module 21 does not output a current to the UPS direct current bus), the UPS backup power supply 23 outputs a direct current to the UPS direct current bus. At the same time, if the UPS direct current bus is further electrically connected to a high-voltage direct current power supply bus through a second direct current/direct current conversion module 24, the second direct current/direct current conversion module 24 may be used to convert a high-voltage direct current on the high-voltage direct current power supply bus into a direct current, and output the direct current obtained by means of conversion to the UPS direct current bus. It should be noted that the high-voltage direct current on the high-voltage direct current power supply bus may be provided by a high-voltage backup power supply 14 on the high-voltage direct current power supply bus, and the high-voltage direct current on the high-voltage direct current power supply bus may also be obtained by the first alternating current/direct current conversion module 11 by converting mains.

In addition, if the second alternating current/direct current conversion module 21 electrically connected to the UPS direct current bus does not connect to mains, the UPS direct current bus becomes off abnormally. Meanwhile, for the high-voltage direct current power supply bus electrically connected to the UPS direct current bus through the second direct current/direct current conversion module 24, if the first alternating current/direct current conversion module 11 electrically connected to the high-voltage direct current power supply bus does not connect to mains either, the high-voltage direct current power supply bus becomes off abnormally. Therefore, the UPS backup power supply 23 electrically connected to the UPS direct current bus may be used to power the UPS direct current bus, and moreover, a direct current on the UPS direct current bus is converted into a high-voltage direct current using the second direct current/direct current conversion module 24, and the high-voltage direct current is output to the high-voltage direct current power supply bus electrically connected to the second direct current/direct current conversion module 24, thereby powering a load on the high-voltage direct current power supply bus.

In an implementation manner of the present disclosure, a fifth direct current/direct current conversion module is connected in series between the rechargeable power supply included by the high-voltage backup power supply 14 and the UPS direct current bus. Therefore, a function of the UPS backup power supply 23 is implemented using a combination of the high-voltage backup power supply 14 and the fifth direct current/direct current conversion module. More preferably, a fifth alternating current/direct current conversion module may also be added to the power supply bus circuit, where the fifth alternating current/direct current conversion module is electrically connected to the second mains end IN2 of the second alternating current/direct current conversion module 21, and the fifth alternating current/direct current conversion module connects to mains using the second mains end IN2, converts the connected mains into a high-voltage direct current that is suitable to charge the high-voltage backup power supply 14, and charges the high-voltage backup power supply 14 using the high-voltage direct current obtained by means of conversion.

Figure 10:
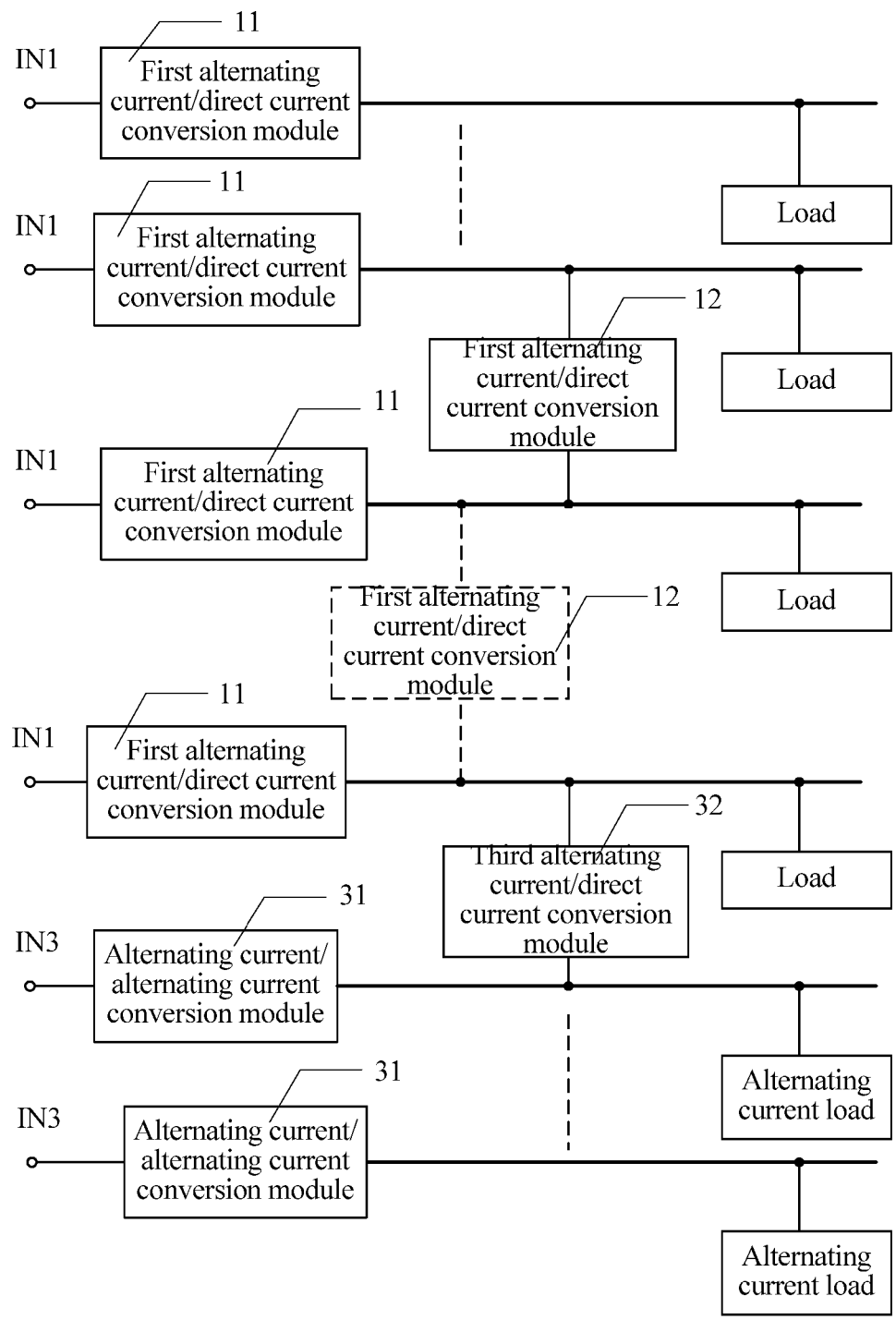
FIG. 10 is another improved structural diagram of composition of a power supply bus circuit according to an embodiment of the present disclosure.

FIG. 10 shows another improved composition structure of a power supply bus circuit according to an embodiment of the present disclosure. For ease of description, only parts related to this embodiment of the present disclosure are illustrated.

As a preferred embodiment of the present disclosure, referring to FIG. 10, the power supply bus circuit further includes one or more alternating current power supply circuits. The alternating current power supply circuit includes an alternating current/alternating current conversion module 31 and an alternating current bus, and the alternating current/alternating current conversion module 31 is electrically connected to the alternating current bus.

In this preferred embodiment, in order to expand an disclosure scope of the power supply bus circuit, an alternating current power supply circuit is added to the power supply bus circuit, where the alternating current power supply circuit has an alternating current bus, and one or more alternating current loads are mounted on the alternating current bus, where the alternating current loads are loads driven by an alternating current. It should be noted that for multiple alternating current loads mounted on a same alternating current bus, the alternating current loads should be loads that use a same alternating current to operate, or an adapter is disposed on the alternating current load, and the adapter adjusts an alternating current of the alternating current bus into an alternating current required by the alternating current load, or the adapter adjusts an alternating current of the alternating current bus into a direct current required by a load.

In this preferred embodiment, the alternating current/alternating current conversion module 31 has a third mains end IN3. The alternating current/alternating current conversion module 31 connects to mains using the third mains end IN3, adjusts the connected mains into an alternating current of a specified type, and outputs the alternating current of the specified type to the alternating current bus electrically connected to the alternating current/alternating current conversion module. It should be noted that the specified type includes but is not limited to a limitation on any one or a combination of the following conditions, where the conditions include a frequency, a peak value (or amplitude), a waveform, and the like.

In this preferred embodiment, an alternating current type carried by an alternating current bus depends on a type required by an alternating current load mounted on the alternating current bus. After the specified type is determined according to the type required by the alternating current load mounted on the alternating current bus, the specified type is set on the alternating current/alternating current conversion module 31, and the alternating current/alternating current conversion module 31 converts mains into an alternating current of the specified type.

It should be emphasized that the power supply bus circuit further includes one or more third alternating current/direct current conversion modules 32, and one third alternating current/direct current conversion module 32 is electrically connected between one high-voltage direct current power supply bus and one alternating current bus. In this preferred embodiment, the power supply bus circuit further includes one or more alternating current power supply circuits. For one or more alternating current power supply circuits requiring mutual backup of power supplies, an alternating current bus of each alternating current power supply circuit is separately electrically connected to a high-voltage direct current power supply bus through one third alternating current/direct current conversion module 32. As an implementation manner of power supply backup, alternating current buses in different alternating current power supply circuits may be separately electrically connected to one high-voltage direct current power supply bus through one third alternating current/direct current conversion module 32. As an implementation manner of power supply backup, alternating current buses in different alternating current power supply circuits may be separately electrically connected to different corresponding high-voltage direct current power supply buses through one third alternating current/direct current conversion module 32.

In this preferred embodiment, the third alternating current/direct current conversion module 32 converts a high-voltage direct current carried by the high-voltage direct current power supply bus connected to the third alternating current/direct current conversion module into an alternating current of a specified type, and outputs the alternating current obtained by means of conversion to the alternating current bus connected to the third alternating current/direct current conversion module, or converts an alternating current carried by the alternating current bus connected to the third alternating current/direct current conversion module into a high-voltage direct current, and outputs the high-voltage direct current obtained by means of conversion to the high-voltage direct current power supply bus connected to the third alternating current/direct current conversion module.

Furthermore, when the alternating current/alternating current conversion module 31 does not connect to mains, causing that the alternating current bus electrically connected to the alternating current/alternating current conversion module 31 may become off abnormally, the third alternating current/direct current conversion module 32 electrically connected to the alternating current bus converts a high-voltage direct current carried by a high-voltage direct current power supply bus connected to the third alternating current/direct current conversion module 32 into an alternating current of a specified type, and outputs the alternating current obtained by means of conversion to the alternating current bus to ensure that the alternating current bus supplies power without interruption in order to prevent the alternating current bus from actually becoming off abnormally.

On the contrary, if the alternating current/alternating current conversion module 31 properly connects to a power supply, the alternating current/alternating current conversion module 31 continuously outputs an alternating current of a specified type obtained by converting mains to the alternating current bus electrically connected to the alternating current/alternating current conversion module 31. Once the high-voltage direct current power supply bus (the high-voltage direct current power supply bus is electrically connected to the alternating current bus through the third alternating current/direct current conversion module 32) becomes off abnormally, the third alternating current/direct current conversion module 32 may be used to convert an alternating current carried by the alternating current bus into a high-voltage direct current, and the high-voltage direct current obtained by means of conversion is output to the high-voltage direct current power supply bus. Moreover, as another bus for mutual backup of power supplies (including another high-voltage direct current power supply bus for mutual backup of power supplies, and a UPS direct current bus as mutual backup of power supplies), the high-voltage direct current power supply bus may also output the high-voltage direct current to the high-voltage direct current power supply bus through the first direct current/direct current conversion module 12 or the second direct current/direct current conversion module 24 in order to ensure that a load on the high-voltage direct current power supply bus is powered without interruption.

As an improvement based on the power supply bus circuit provided in FIG. 2, FIG. 4, FIG. 5, FIG. 6, FIG. 7, FIG. 9, or FIG. 10, as a preferred embodiment of the present disclosure, the power supply bus circuit further includes an adjustment and control module, and the adjustment and control module is connected to the first alternating current/direct current conversion module 11. It should be noted that a manner in which the adjustment and control module is connected to the first alternating current/direct current conversion module 11 may be a wired connection manner or a wireless connection manner (for example, a connection is established using a wireless local area network). The adjustment and control module outputs a voltage adjustment instruction to the first alternating current/direct current conversion module 11.

The first alternating current/direct current conversion module 11 adjusts, in a process of adjusting connected mains into a high-voltage direct current, the high-voltage direct current to a preset voltage specified by the voltage adjustment instruction, and outputs a high-voltage direct current having the preset voltage to the high-voltage direct current power supply bus electrically connected to the first alternating current/direct current conversion module.

In this preferred embodiment, the preset voltage is determined according to a voltage required by a load mounted on the high-voltage direct current power supply bus. Then, the adjustment and control module sends a voltage adjustment instruction to the first alternating current/direct current conversion module 11 electrically connected to the high-voltage direct current power supply bus, where the voltage adjustment instruction includes the preset voltage. Further, the first alternating current/direct current conversion module 11 adjusts, in a process of adjusting mains, the mains into a high-voltage direct current having the preset voltage. Therefore, the first alternating current/direct current conversion module 11 outputs the high-voltage direct current having the preset voltage to the high-voltage direct current power supply bus, thereby supplying a matching power to a load on the high-voltage direct current power supply bus through the high-voltage direct current power supply bus.

As a preferred embodiment of the present disclosure, the adjustment and control module is electrically connected to the second alternating current/direct current conversion module 21 included by the UPS power supply circuit.

A specified voltage is determined in advance for a direct current that the UPS direct current bus needs to transfer. Then, the adjustment and control module sends a voltage specifying instruction to the second alternating current/direct current conversion module 21 electrically connected to the UPS direct current bus, where the voltage specifying instruction includes the specified voltage. Further, the second alternating current/direct current conversion module 21 adjusts, in a process of adjusting mains, the mains into a direct current having the specified voltage such that the second alternating current/direct current conversion module 21 outputs the direct current having the specified voltage to the UPS direct current bus to ensure that a voltage of a direct current carried by the UPS direct current bus is the specified voltage.

As a preferred embodiment of the present disclosure, the adjustment and control module is electrically connected to the alternating current/alternating current conversion module 31 included by the alternating current power supply circuit.

In this preferred embodiment, the specified type is determined according to a type of an alternating current required by an alternating current load mounted on the alternating current bus. Then, the adjustment and control module sends a type adjustment instruction to the alternating current/alternating current conversion module 31 electrically connected to the alternating current bus, where the type adjustment instruction includes the specified type. Further, the alternating current/alternating current conversion module 31 adjusts, in a process of adjusting mains, the mains into an alternating current of the specified type such that the alternating current/alternating current conversion module 31 outputs the alternating current of the specified type to the alternating current bus, thereby supplying matching power to an alternating current load on the alternating current bus.

The foregoing content further describes the present disclosure in detail with reference to specific preferred embodiments, and the specification should not be construed as a limitation on the specific embodiments of the present disclosure. A person of ordinary skill in the art, to which the present disclosure belong, may make some equivalent replacements or obvious variations without departing from the principle of the present disclosure, performance or functions of the replacements or variations are the same as that in the present disclosure, and the replacements or variations should fall within the protection scope determined by the claims of the present disclosure.

What is claimed is:

1. A power supply bus circuit comprising a high-voltage power supply circuit, wherein the high-voltage power supply circuit comprises:
   at least two alternating current/direct current (AC/DC) converters, wherein each of the AC/DC converters comprises a power grid feedback circuit;
   at least two high-voltage direct current (HVDC) power supply buses, wherein each of the HVDC power supply buses is electrically coupled to a separate AC/DC converter of the at least two AC/DC converters;
   at least one high-voltage backup power supply electrically coupled to at least one of the HVDC power supply buses; and
   at least one direct current/direct current (DC/DC) converter,
   wherein each of the AC/DC converters comprises a corresponding mains end,
   wherein a first AC/DC converter of the AC/DC converters is electrically coupled to one HVDC power supply bus of the HVDC power supply buses,
   wherein the first AC/DC converter is configured to:
      connect to mains using a first mains end of the AC/DC converter;
      adjust the alternating current at the mains into a direct current; and
      output the direct current to a first HVDC power supply bus,
   wherein the first HVDC power supply bus is electrically coupled to the first AC/DC converter,
   wherein the power grid feedback circuit is configured to:
      receive the direct current from the first HVDC power supply bus when the high-voltage backup power supply discharges;
      invert the direct current into an alternating current; and
      output the alternating current through the first mains end of the first AC/DC converter,
   wherein a first DC/DC converter is electrically coupled between two of the HVDC power supply buses, and
   wherein the first DC/DC converter is configured to perform voltage conversion on the direct current between the two HVDC power supply buses that are coupled to the first DC/DC converter so as to implement mutual backup of power supplies between the two HVDC power supply buses.

2. The power supply bus circuit of claim 1, wherein the HVDC power supply bus is electrically coupled to one or more high-voltage backup power supplies.

3. The power supply bus circuit of claim 2, wherein the high-voltage backup power supply comprises one or more rechargeable power supplies, wherein the HVDC power supply bus is electrically coupled to the rechargeable power supplies, and wherein the rechargeable power supplies are charged through the HVDC power supply bus that is coupled to the rechargeable power supplies.

4. The power supply bus circuit of claim 2, wherein the high-voltage backup power supply comprises one or more rechargeable power supplies, wherein the HVDC power supply bus is electrically coupled to the rechargeable power supplies, and wherein the rechargeable power supplies are discharged through the HVDC power supply bus that is coupled to the rechargeable power supplies.

5. The power supply bus circuit of claim 2, wherein the high-voltage backup power supply comprises one or more new energy power supplies, wherein the high HVDC power supply bus is electrically coupled to the new energy power supplies, and wherein the new energy power supplies discharge through the HVDC power supply bus that is coupled to the new energy power supplies.

6. The power supply bus circuit of claim 5, wherein the new energy power supply comprises a solar energy power supply and a wind energy power supply.

* * * * *